United States Patent [19]
Yamazaki et al.

[11] 4,104,663
[45] Aug. 1, 1978

[54] MULTIPLE OBJECTIVE LENS CAMERA

[75] Inventors: Yasuo Yamazaki, Kawachinagano; Taizo Kawaguchi, Amagasaki; Kazuo Kimura, Sakai, all of Japan

[73] Assignee: Minolta Camera Kabushiki Kaisha, Osaka, Japan

[21] Appl. No.: 790,220

[22] Filed: Apr. 25, 1977

[30] Foreign Application Priority Data

May 12, 1976 [JP] Japan .................... 51-53251

[51] Int. Cl.² .................... G03B 3/00; G03B 13/02
[52] U.S. Cl. .................... 354/197; 354/219
[58] Field of Search .................... 354/202, 275, 200, 221, 354/197, 199, 219

[56] References Cited
U.S. PATENT DOCUMENTS

| | | | |
|---|---|---|---|
| 3,240,107 | 3/1966 | Prister | 354/219 |
| 3,517,582 | 6/1970 | Pituley | 354/219 |
| 3,890,626 | 6/1975 | Ettischer | 354/197 |
| 3,925,797 | 12/1975 | Ettischer | 354/197 |

*Primary Examiner*—Donald A. Griffin
*Attorney, Agent, or Firm*—Wolder, Gross & Yavner

[57] ABSTRACT

A compact camera contains a plurality of objective lenses which are selectively alternatively advanced by external manipulation into registry with the camera photographing optical axis to vary the image magnification. A view finder optical system is provided which includes a lens member which is movable into and out of registry with the view finder optical system to vary the viewer field to correspond to the field of the operative objective lens. A lens storage space is provided between the laterally spaced view finder and photographing optical axis, one of the objective lenses when retracted occupies the storage space and when this lens is advanced to the photographic optical axis it may be replaced in the storage space by the retracted view finder lens member.

12 Claims, 13 Drawing Figures

MULTIPLE OBJECTIVE LENS CAMERA

BACKGROUND OF THE INVENTION

The present invention relates generally to improvements in cameras and it relates particularly to an improved compact camera self-containing a plurality of objective lenses which are selectively alternatively transferred between displaced and operative positions and a view finder whose field is varied in accordance with the power of the operatively positioned objective lens.

With a camera of the type, in which the power of magnification of the picture-taking or objective lens system is varied by selectively moving two or more objective lenses built or self-retained in the camera into or out of the picture-taking or photographing optical path, it has been necessary to change the picture-taking field or range indicated within the associated view finder in conformity with the selected magnification of the picture-taking lens system.

Mechanisms proposed for changing the picture-taking range indicated within the finder may be classified into two types in which:

(1) The size of a view frame within the finder is changed, while maintaining the magnification of the image in the finder constant, thereby indicating the picture-taking field of the operative picture-taking lens system; and (2) The magnification of the image in the finder is varied while maintaining the size of the view frame in a finder constant.

According to the first mechanism, the size of the view limiting frame consisting of an Albada finder system alone may be varied, without varying the magnification of the image in the finder, and hence the construction may be simplified. However, in case a picture-taking lens system is changed from a standard lens to a telephoto lens, the size of the view frame of the finder is reduced, and in addition, the finder image is reduced in size, because an object in general is located at a great distance, with the result that detailed observation of the object becomes difficult.

In contrast thereto, the second mechanism is devoid of the aforesaid shortcoming and provides advantages over the first mechanism. However, a complicated structure is required for varying the magnification of the image in the finder, with the resulting increase in the size of the finder as well as in the manufacturing cost.

Moreover, a mechanism has been proposed in which a zoom lens system is employed as a finder optical system for varying the magnification of the image in the field of view of the finder, providing the basic optical system as shown in FIG. 1 of the drawing herein. More particularly, the finder optical system proposed includes an inverse Galilean finder system consisting of a concave objective lens 1 and a convex movable lens 2, a concave lens 3 for use in an Albada finder, and an eye-piece 4, so that the magnification of the image in the finder may be varied by moving the convex movable lens 2 along the system optical axis in the direction of arrows e. In addition, as is well known, the size of the view limiting frame is so arranged as to be maintained constant by means of an optical image frame 4a formed on the object side of eye piece 4, and mirror surface 3a which is formed on the image side of concave Albada lens 3 and shown by a thick line.

In general, important fundamental problems in the finder system are whether or not an optimum magnification is achieved for an image, and how far the image of an object is viewed, when observed in the finder, i.e., a dioptric power problem.

However, with the finder lens system as shown in FIG. 1, when the image magnification of the finder remains substantially unchanged, i.e., in a range lower than 1.5, variation in magnification will not lead to a marked variation in dioptric power, thus providing desired practicability in actual application. However, when the finder magnification is increased to over 1.5, in response to a variation in the magnification of the picture-taking lens, then the variation in the dioptric power will exceed 1 diopter, so that in case the magnification exceeds 2, then the view in the finder becomes hard to recognize, and in addition, marked distortion of the field results, thus failing to provide the desired practicability for a short-sighted photographer who suffers from an insufficient adjusting capability of the eyes.

This may be attributed to the fact that part of the lenses constituting the finder optical system is moved only along the optical axis of a finder, so that compensation for aberration cannot be positively achieved.

SUMMARY OF THE INVENTION

It is a principal object of the present invention to provide an improved camera for effecting variation in magnification by transferring one of two or more picture-taking or objective lenses built or self-contained in a camera body into or out of the photographing or picture-taking optical path, in which there is provided a finder capable of varying the magnification of the object image in the finder, with the size of the view finder limiting frame maintained constant, and yet with the dioptric power being maintained unchanged.

It is another object of the present invention to provide a camera of a compact size, in which a given space within the camera body may be alternately utilized as a common retracting position both for part of lenses in the finder optical system, which may be so arranged as to move into or out of the finder optical path, and for the movable picture-taking lenses which are self-contained in the camera body.

BRIEF DESCRIPTION OF THE DRAWINGS

FIG. 2 is a side elevational view showing one example of a finder optical system in which an Albada system is obviated according to the present invention, the aforesaid finder optical system being capable of varying the image magnification without changing the dioptric power, and in which

FIG. 3 is a side elevational view of a finder optical system in which an Albada system is obviated according to another embodiment of the present invention, in which

FIG. 5 is a top plan view showing one example of the detailed arrangement of the picture-taking lenses positioned within the space shown in FIG. 4, in which

FIG. 6 is a top plan view showing one example of the arrangement of the picture-taking lenses positioned in the space shown in FIG. 4, in which

DESCRIPTION OF THE PREFERRED EMBODIMENTS

Figure 1:
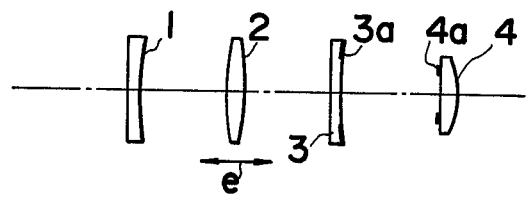
FIG. 1 is a side-elevational view showing one example of a prior art finder optical system in which the magnification of the finder image may be varied.
Figure 2A:
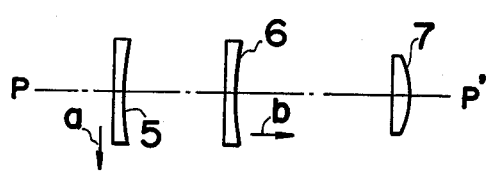
FIG. 2(A) illustrates the condition of standard magnification.
Figure 2B:
FIG. 2(B) illustrates the condition of a telephoto magnification.

Referring now to FIGS. 2 to 8 which illustrate preferred embodiments of the present invention, FIGS. 2(A) and (B) show one embodiment of a finder optical system according to the present invention, in which FIG. 2(A) illustrates the condition of standard magnification, while FIG. 2(B) illustrates the condition of telephoto magnification, although an Albada system is not shown. For standard magnification, concave lens 5, concave lens 6 and convex lens 7 in a lens system are consecutively arranged in this order from the front or object side along the finder optical axis P–P', as shown in FIG. 2(A). For shifting from a standard magnification to a telephoto magnification, the concave lens 5 is transversely retracted in the direction of arrow $a$ from the optical axis P–P', while concave lens 6 is moved toward the face of convex lens 7 in the direction of arrow $b$ along its optical axis, as shown in FIG. 2(B).

Figure 3A:
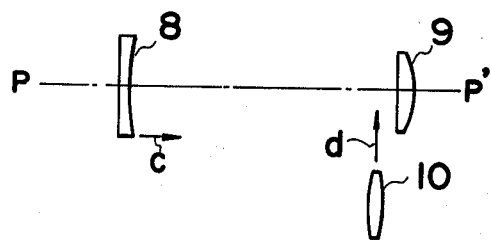
FIG. 3(A) illustrates the case of a standard magnification.
Figure 3B:
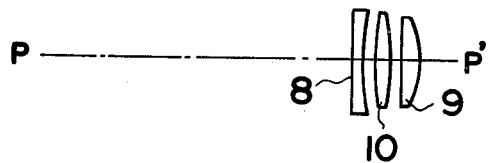
FIG. 3(B) illustrates the condition of a telephoto magnification.

FIG. 3 shows another embodiment of a finder optical system. For standard magnification, front concave lens 8 and successive convex lens 9 are arranged in a lens system as shown in FIG. 3(A). For shifting from standard magnification to telephoto magnification, concave lens 8 is moved in the direction of arrow $c$ towards the face of convex lens 9, while convex lens 10 which has been retracted from the optical axis P–P' for standard magnification is moved into the optical axis P–P' in the direction of the arrow $d$, as shown in FIG. 3(B).

In either case, concave lens 6 or lens 8 should be moved along the optical axis P–P', while lens 5 or lens 10 should be moved into or out of the optical axis P–P'. Thus there is required a space, into which lens 5 or lens 10 is to be moved when retracted from the finder optical axis P–P'.

Figure 4:
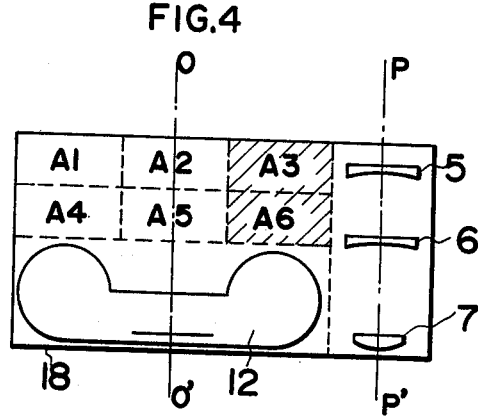
FIG. 4 is a top plan view of a camera of a small size, showing the spaces alloted within the camera and in which the magnification may be varied.

Further, FIG. 4 shows a small-size or compact camera of a flat cubic shape, into which a film cartridge may be loaded. This camera has a picture-taking lens system consisting of two or more lenses having different magnifications and effects the magnification by selectively moving one of the picture-taking or objective lenses onto the picture taking optical axis O–O'. The respective components of the camera are arranged as shown in FIG. 4 for reducing the size of the camera. As shown in FIG. 4 a film cartridge 12 is removably loaded in a predetermined position within the camera case 18, and thus the position of the picture-taking optical axis and focal or image plane is determined. Position sidewise of camera case 18 is a finder optical system P–P' consisting of lenses 5, 6, 7 and the like. Depending on the desired magnification of the picture-taking lens system, either one of standard objective lens system 15 and telephoto objective lens system 14 is positioned in either one of spaces A2 and A5 on the optical axis O–O' of a camera. The above condition is shown as a block diagram in FIGS. 5(A) and (B) or FIG. 6(A) or (B).

Figure 5A:
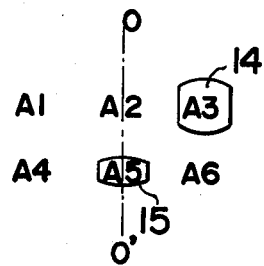
FIG. 5(A) illustrates a standard picture-taking condition.
Figure 5B:
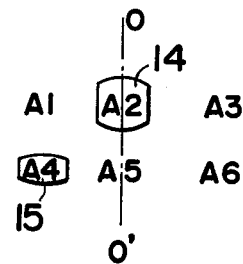
FIG. 5(B) illustrates a telephoto picture-taking condition.

FIG. 5(A) shows the case of a standard picture-taking lens system, in which standard objective lens system 15 is positioned in a space A5 on the picture-taking optical axis O–O' of a camera. In this respect, assume that telephoto objective lens system 14 is positioned in a space A3 off the picture-taking optical axis O–O', then spaces A1, A2, A4, A6 are not occupied by a lens system. When telephoto objective lens system 14 is moved into the space A2 on the picture-taking optical axis O–O', as shown in FIG. 5(B), standard objective lens system 15 retracts into the space A4, while the spaces A1, A3, A5, A6 are not occupied by a lens system. In either case of FIGS. 5(A) (B), the spaces which are not occupied by an objective lens system remain to be A1, A6. Assume that the space A1 is allotted for a space for locating a shutter operating mechanism therein, while the space A6 is allotted for locating other camera mechanisms therein. When telephoto objective lens system 14 is moved into the space A2 on the picture-taking optical axis O–O', the space A3 on the side of the finder optical axis P–P' becomes empty. This empty space A3 may be used as a storage space for concave lens 5, when retracting from the finder optical axis P–P' in the direction of arrow $a$, as shown in FIG. 2(A), upon shifting from standard magnification to telephoto magnification in a finder optical system.

Figure 6A:
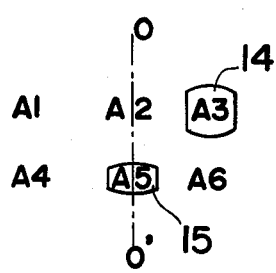
FIG. 6(A) illustrates a standard picture-taking condition.
Figure 6B:
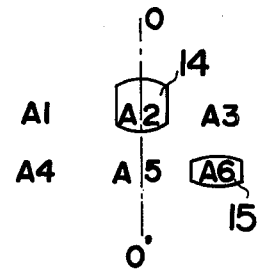
FIG. 6(B) illustrates a telephoto picture-taking condition.

In FIG. 6(A), standard objective lens system 15 is located in the space A5 on the picture-taking optical axis O–O', telephoto objective lens system 14 is located in the space A3 offset from and out of registry with the optical axis O–O', and spaces A1, A2, A4, A6 are unoccupied by a picture-taking lens system. In the telephoto picture-taking condition as shown in FIG. 6(B), however, the telephoto objective lens system 14 is moved into the space A2 on the picture-taking optical axis O–O', and standard objective lens system 15 is moved from the space A5 on the optical axis O–O' into the space A6, while the spaces A1, A3, A4 A5 are unoccupied by a picture-taking lens system. As has been described earlier, a shutter operating mechanism and other camera mechanisms are located in the spaces A1, A6 which are not occupied by either of the objective lenses.

The space A6 which has remained empty as illustrated in FIG. 6(A) may be allotted as a space, into which convex lens 10 is retracted from the finder optical system in the direction opposite to the direction of arrow $d$ in the finder optical system for the standard picture-taking condition, as shown in FIG. 3. As a result, a space into which convex lens 10 is retracted need not be additionally provided.

Figure 7:
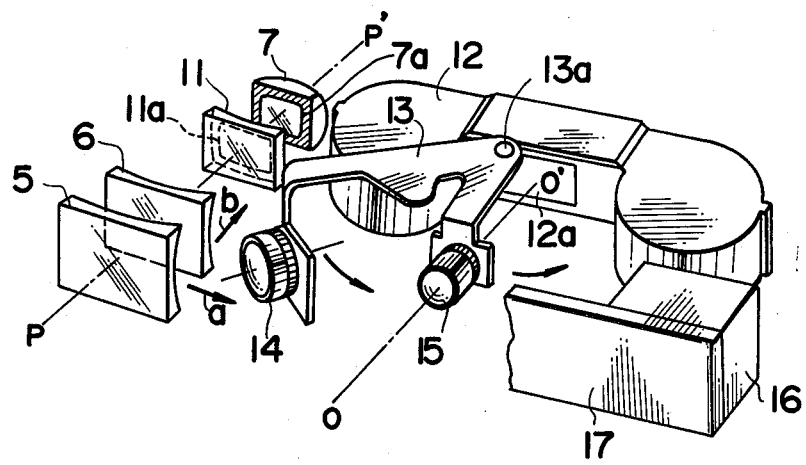
FIG. 7 is a perspective view showing an essential part of one embodiment of the present invention in a standard picture-taking condition.
Figure 8:
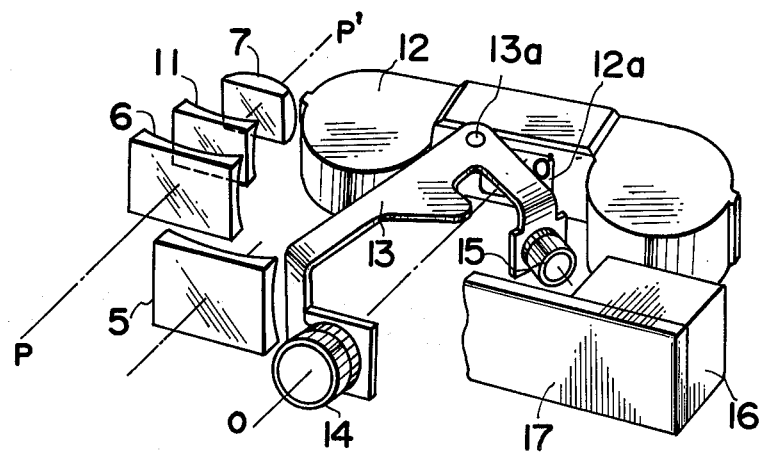
FIG. 8 is a perspective view of the essential part of the camera shown in FIG. 7 in a telephoto picture-taking condition.

FIGS. 7 and 8 show one embodiment of the present invention, in which there is provided a camera as shown in FIG. 5, incorporating a finder lens system shown in FIG. 2.

Referring to FIG. 7 which shows the standard picture-taking condition, concave lens 5, concave lens 6, Albada lens 11 having a concave surface facing the eyepiece lens 7, and convex eyepiece lens 7 are consecutively located in this order from the front or object side on the finder optical axis, while optical image frame 7a is formed on the surface of the eyepiece on the object side, and reflecting surface 11a is provided on the concave surface of Albada lens 11.

On the other hand, objective lenses for the camera, i.e., standard objective lens 15 and telephoto objective lens 14 are mounted on respective arms of a V-shaped lever 13 which is pivoted to a camera body by means of a shaft 13a in a manner to be rotatable through a limited predetermined angle. Shown at 12 is film cartridge which is to be loaded in a predetermined position in the camera body, and film cartridge 12 is provided with an exposure window 12a. Shutter member 17 is operated by means of a shutter operating member 16 occupying the space A1 as shown in FIG. 5.

In a standard picture-taking condition, the V-shaped lever 13 assumes a first position by turning in a clockwise direction from its home position, and the standard objective lens 15 is thus located on the picture-taking optical axis O–O' passing through the center of exposure window 12a which lies in the camera focal plane and intersecting exposure window 12a at a right angle, and positioned in the space A5. In contrast thereto, telephoto objective lens 14 is positioned in the space A3 off the picture-taking optical axis.

For shifting or transferring from a standard picture-taking condition to a telephoto picture-taking condition as shown in FIG. 8, V-shaped lever 13 is rotated in the direction of the arrow as shown in FIG. 7 in the counterclockwise direction, thereby shifting telephoto objective lens 14 from the space A3 to the second position in the space A2 on the picture-taking optical axis O–O'. At this time, standard objective lens 15 is moved from the space A5 on the optical axis O–O' to the space A4 offset from the optical axis O–O'.

On the other hand, it is necessary for the finder optical system P–P' that concave lens 5 be moved away from the optical axis in the direction a and concave lens 6 be moved along the optical axis P–P' in an arrow direction b for varying the magnification of the finder image of the view finder in response to the selection of the objective lenses. At this time, telephoto objective lens 14 which has occupied the space A3 in the standard picture-taking condition is moved into the space A2, so that the space A3 becomes empty, and as a result concave lens 5 may retract into the space A3 as shown in FIG. 8. Accordingly, a space, into which concave lens 5 retracts, should not be additionally provided thus contributing to a reduction in the size of the camera.

As is apparent from the foregoing description, when the magnification of a finder optical system is varied, part of the lenses in the optical system may be not only retracted from the optical path but also moved along its optical axis, without changing its dioptric power. In addition, the aforesaid part of lenses in the finder optical system may be moved into a space, from which an objective lens has been moved from its retracting position to the position on the optical path for varying a magnification, so that a space into which part of the finder optical system is to retract, should not be additionally provided thereby permitting efficient utilization of the space within the camera body.

Figure 9:
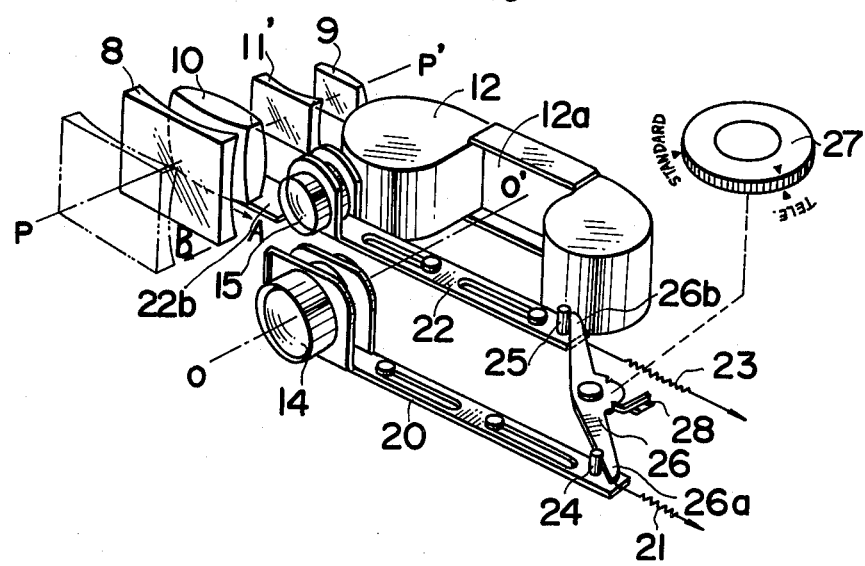
FIG. 9 is a perspective view of another embodiment of the present invention shown in a telephoto picture-taking condition.

FIG. 9 shows another embodiment of the present invention, in which there is provided a camera shown in FIG. 6, incorporating the finder lens system as shown in FIG. 3.

In FIG. 9 showing a telephoto picture-taking condition, concave lens 8 and convex lens 10 are positioned on the axis P–P' of the finder optical system from the object side, as shown in FIG. 3, followed by Albada lens 11' having a concave surface facing the eyepiece lens 9, and the rear convex eyepiece lens 9 consecutively in this order, while as in FIG. 7, an optical image frame and a reflecting surface (not shown) are provided on the surface of convex eyepiece lens 9 on the object side as well as on the concave surface of Albada lens 11' respectively.

Telephoto objective lens 14 is mounted on a first slide plate 20 which is slidingly movable over a predetermined range in a direction perpendicular to the picture-taking optical axis, by means of know pin-slot coupling or the like. First slide plate 20 is spring-loaded by a tension spring 21 provided between the slide plate 20 and a stationary portion of the camera in a manner that telephoto objective lens 14 held by one end thereof is urged to a position on the picture-taking optical path. On the other hand, standard objective lens 15 is mounted on second slide plate 22 which is slidably movable over a predetermined range in the direction parallel with first slide plate 20 and is urged to a position on the picture-taking optical path by means of a tension spring 23 provided between the second slide plate 22 and a stationary portion of the camera body. Meanwhile, one end 22b of second slide plate 22 extends up to a finder mechanism for supporting convex lens 10 in the finder optical system, in a manner that convex lens 10 is moved into or from the finder optical path in response to the movement of standard objective lens 15. Pins 24, 25 are carried by first and second slide plates 20, 22. Shown at 26 is a control lever coupled to and cooperating with a switching dial 27 provided on the outer surface (not shown) of the camera body, while both arm portions 26a, 26b of control lever 26 engage pins 24, 25 at all times. Shown at 28 is a click spring for locking control lever 26 in a given rotational position by releasably engaging respective notches in the central section of lever 26. Shown at 12 is a film cartridge loaded in a predetermined position within the camera body, as has been described earlier, and the film cartridge is equipped with an exposure opening 12a.

As shown in FIG. 9, in the telephoto picture-taking condition, control lever 26 is in the rotational position which has been assumed by lever 26 when rotated through a predetermined angle in the counterclockwise direction so that first slide plate 20 is located in the position effected by the spring 21 and second slide plate 22 is urged by arm 26b in the direction opposite to the biasing direction of spring 23. Accordingly, the telephoto objective lens 14 occupies the space A5 of FIG. 6 on the picture-taking optical axis O–O' passing through the center of exposure opening 12a and perpendicularly incident on the opening 12a. In contrast thereto, standard objective lens 15 remains in the space A3 offset from the picture-taking optical axis O–O'.

For shifting from the above condition to the standard picture-taking condition, switching dial 27 is rotated from a TELE position to a STANDARD position, by returning the switching dial externally of the camera. Clockwise rotation of control lever 26 then causes first slide plate 20 to be moved in the direction opposite to the biasing direction of spring 21, while causing second slide plate 22 to be moved to a position drawn by spring 23. As a result, telephoto objective lens 14 is retracted from the space A2 on the optical axis O–O' to the space A3 offset from the optical axis, while standard objective lens 14 is moved from the space A6 into the space A5 on the picture-taking optical axis O–O', (FIG. 6(a)).

On the other hand, in the finder optical system P–P', concave lens 8 is moved by known means along the optical axis P–P' in the direction of arrow B in response to the selection of objective lenses, while concave lens 10 mounted on second slide plate 22 is moved in the direction of arrow A. At this time, the space A6 within the camera body becomes empty due to the removal of standard objective lens 15 therefrom, so that convex lens 10 may retract into the space A6, which is empty. Accordingly, the space A6 may be used as a common retracting space both for standard objective lens 15 and for convex lens 10 in the finder system, thus dispensing with an additional space for convex lens 10 to retract with the resulting reduction in size of a camera.

When the camera shown in FIG. 6 is employed as the space A3 into which telephoto objective lens 14 is retracted at the time of standard picture-taking becomes empty, such space A3 may be used as a retracting space for part of the lenses in the finder optical system. This permits the use of the finder optical system as shown in FIG. 2.

While there has been described and illustrated preferred embodiments of the present invention, it is apparent that numerous alterations, omissions and additions may be made without departing from the spirit thereof.

We claim:

1. A camera comprising:
   a body having a lens storage space and a photographic optical axis perpendicularly incident on a focal plane in said body;
   a plurality of objective lenses located in said body and selectively transferrable between advanced and retracted positions respectively in and out of registry with said optical axis for varying the camera image magnification;
   a finder optical system proximate said storage space and including a field varying lens member transferrable between advanced and retracted positions respectively in and out of registry with said finder optical system, said lens member in its retracted position occupying said lens storage space; and
   operating means for selectively advancing and retracting a first of said objective lenses, said first objective lens in its retracted position occupying said storage space and in its advanced position being out of said storage space and permitting the occupation thereof by said lens member.

2. A camera as set forth in claim 1, wherein said objective lenses include a standard objective lens for use in photographing at a predetermined magnification, and a telephoto objective lens for use in photographing at a magnification higher than that of said standard objective lens.

3. A camera as set forth in claim 2, wherein the optical axis of said finder optical system and the photographic optical axis are located in a common plane perpendicular to said focal plane and said standard objective lens and said telephoto objective lens are movable with the optical axes thereof maintained along said plane.

4. A camera as set forth in claim 3, wherein said finder optical system comprises an inverse Galilean type finder and includes an Albada optical element positioned to form a view-limiting frame delineating a picture-taking range.

5. A camera as set forth in claim 4, wherein at least said telephoto objective lens is movable from its retracted position in said storage space in the vicinity of said finder optical path to its advanced position, and said lens member comprises a concave lens which occupies said storage space when in retracted position from the finder optical path, said storage space being the space which has been occupied by the retracted telephoto objective lens before moving to is advanced position.

6. A camera as set forth in claim 5, wherein said operating means includes a V-shaped lever including two arms one of which holds said telephoto objective lens and the other of which holds said standard objective lens, said lever being swingable through a predetermined angle so as to selectively transfer said lenses between their advanced and retracted positions.

7. A camera as set forth in claim 5, wherein said operating means comprises a first slide plate slidably movable over a given range and supporting said telephoto objective lens for movement therewith between its retracted position occupying said storage space in the vicinity of said finder optical path and its advanced position; a second slidably movable slide plate supporting said standard objective lens for movement therewith between its retracted position and its advanced position; and an externally operable control member for moving said first and second slide plates to selectively advance said telephoto objective lens and said standard objective lens into registry with said photographic optical axis.

8. A camera as set forth in claim 4, wherein said standard objective lens is movable from its retracted position in said storage space in the vicinity of said finder optical path to its advanced position, and said lens member comprises a convex lens which may enter said storage space from which said standard objective lens has advanced into registry with said camera body optical axis.

9. A camera as set forth in claim 8 wherein said operating means comprises a first slide plate supporting said telephoto objective lens and slidably movable with said telephoto objective lens over a given range between its retracted position and its advanced position; a second slide plate slidably movable over a given range and supporting said standard objective lens for movement therewith between its retracted position in said storage space in the vicinity of said finder optical path and its advanced position; and an externally operable control member for moving said first and second slide plates for selectively moving said telephoto objective lens and said standard objective lens to their advanced positions.

10. A camera comprising:
    a camera body having a lens storage space and a photographic image optical axis;
    a plurality of objective lenses selectively movable between respective advanced positions in registry with said photographic image optical axis and transversely offset from said photographic image optical axis, a first of said objective lenses in its retracted position occupying said lens storage space;
    a view finder optical system including a lens member movable between an advanced position in registry with the optical axis of said view finder optical system and a retracted position occupying said lens storage space transversely offset from said view finder optical system to vary the field of view of said view finder; and
    means for selectively alternatively transferring said objective lenses to their respective advanced positions, said storage space being empty of said first objective lens when said first objective lens is in its advanced position to permit the retraction of said view finder lens member into said storage space.

11. The camera of claim 10 wherein the optical axes of said view finder optical system and the camera photographic axis are laterally spaced and said storage space is disposed between said axes.

12. The camera of claim 11 including means for advancing and retracting said view finder lens member with the retraction and advance respectively of said first objective lens.

* * * * *